United States Patent
Sage

[19]

[11] Patent Number: 6,123,309
[45] Date of Patent: Sep. 26, 2000

[54] SUPPORT ASSEMBLY WITH CABLE HOLDDOWN DEVICE

[75] Inventor: William L. Sage, Rogers, Ark.

[73] Assignee: Assembled Products Corporation, Rogers, Ark.

[21] Appl. No.: 09/169,579

[22] Filed: Oct. 9, 1998

[51] Int. Cl.[7] .................................................. A47G 1/10
[52] U.S. Cl. ........................................................ 248/316.1
[58] Field of Search ............................... 248/316.1, 371, 248/397, 161, 415, 157, 177.1, 178.1, 183.1, 183.2, 185.1, 187.1, 291.1, 316.5, 503, 505, 441.1, 447, 447.2, 451, 452, 454, 457, 458, 497, 510, 917; 108/43–45, 49–50; D6/511; 296/3; 410/100; 29/244

[56] References Cited

U.S. PATENT DOCUMENTS

| | | | |
|---|---|---|---|
| D. 308,497 | 6/1990 | Roche | D12/133 |
| D. 331,332 | 12/1992 | Farmer | D6/418 |
| 364,083 | 5/1887 | Bennett | D6/511 |
| D. 367,387 | 2/1996 | Sweere | D6/511 |
| 1,274,317 | 7/1918 | Palmenberg . | |
| 2,067,323 | 1/1937 | Hirsch . | |
| 2,458,213 | 1/1949 | Smith . | |
| 2,539,997 | 1/1951 | Graves . | |
| 2,550,018 | 4/1951 | Morrison et al. . | |
| 2,567,593 | 9/1951 | Bemis . | |
| 2,815,566 | 12/1957 | Hille . | |
| 2,828,577 | 4/1958 | Anderson | 248/452 |
| 3,095,835 | 7/1963 | Smith | D6/511 |
| 3,313,511 | 4/1967 | Koerner et al. | 248/499 |
| 3,408,752 | 11/1968 | Lollmann . | |
| 3,751,978 | 8/1973 | Crawford | 73/49.7 |
| 4,008,669 | 2/1977 | Sumrell | 248/499 |
| 4,122,587 | 10/1978 | Weiss et al. | 128/134 |
| 4,280,432 | 7/1981 | Dessel . | |
| 4,314,783 | 2/1982 | Parnell et al. | 410/34 |
| 4,358,232 | 11/1982 | Griffith | 248/499 |
| 4,365,561 | 12/1982 | Tellier et al. . | |
| 4,538,523 | 9/1985 | Koch | 105/20 |
| 4,562,987 | 1/1986 | Leeds et al. . | |
| 4,567,835 | 2/1986 | Reese et al. . | |
| 4,632,349 | 12/1986 | Anstey | 248/918 |
| 4,657,214 | 4/1987 | Foster . | |
| 4,781,355 | 11/1988 | Jeantin . | |
| 4,854,538 | 8/1989 | Von Schalscha | 248/346 |
| 4,946,120 | 8/1990 | Hatcher | 248/183 |
| 4,956,928 | 9/1990 | Lehrman . | |
| 5,031,956 | 7/1991 | Hudgins | 248/499 |
| 5,104,141 | 4/1992 | Grove et al. . | |
| 5,106,141 | 4/1992 | Mostashari . | |
| 5,135,197 | 8/1992 | Kelley et al. . | |
| 5,218,348 | 6/1993 | Trotta . | |
| 5,263,423 | 11/1993 | Anderson | 108/43 |
| 5,330,147 | 7/1994 | Volcheff et al. | 248/316.4 |
| 5,354,077 | 10/1994 | Soo | 280/11.12 |
| 5,362,025 | 11/1994 | Trom et al. | 248/670 |
| 5,383,258 | 1/1995 | Nicoletti . | |
| 5,393,025 | 2/1995 | Franklin | 248/317 |
| 5,429,337 | 7/1995 | Poole | 248/918 |
| 5,431,365 | 7/1995 | Hopkins . | |
| 5,485,793 | 1/1996 | Crowell | 108/44 |
| 5,564,668 | 10/1996 | Crowe, II | 248/918 |
| 5,590,607 | 1/1997 | Howard | 108/98 |
| 5,607,091 | 3/1997 | Musacchia | 224/222 |
| 5,615,620 | 4/1997 | Owen . | |
| 5,636,822 | 6/1997 | Hendershot et al. | 248/346.01 |
| 5,667,272 | 9/1997 | Sutton | 297/140 |
| 5,673,628 | 10/1997 | Boos | 248/918 |
| 5,725,189 | 3/1998 | Landy | 248/205.2 |
| 5,727,808 | 3/1998 | Broughton | 280/615 |
| 5,740,591 | 4/1998 | Hopkins | 24/302 |
| 5,769,369 | 6/1998 | Meinel | 248/178.1 |
| 5,775,657 | 7/1998 | Hung | 248/289.11 |
| 5,782,684 | 7/1998 | Shaff | 452/128 |
| 5,832,840 | 11/1998 | Woof | 108/6 |
| 5,908,274 | 6/1999 | Silberman | 410/10 |

*Primary Examiner*—Ramon O. Ramirez
*Attorney, Agent, or Firm*—Boyd D. Cox

[57] ABSTRACT

The support assembly comprises a primary platform having a plurlity of adjustable holddown devices for securing a laptop computer or other equipment while providing full access to the equipment supported thereon. Each of the adjustable holddown devices includes a quick release clamp which actuates the locking and releasing of the cable adapted to encircle the equipment on the primary platform. A secondary platform for supporting a computer printer or other accessory equipment is adjustably attached to the primary platform.

22 Claims, 6 Drawing Sheets

SUPPORT ASSEMBLY WITH CABLE HOLDDOWN DEVICE

BACKGROUND

The invention is a support assembly for adjustably supporting equipment, such as a laptop computer, a facsimile machine, or a phone in a transport vehicle. The support assembly includes a primary platform having an adjustable holding means that can be adjusted to secure differently sized and differently configured equipment while allowing the user full access to the equipment. Additionally, a secondary platform can be added to hold accessory equipment, such as a printer.

The advent of laptop computers has enabled one to perform his or her work outside of the office, as is often the case with frequent business travelers and telecommuters. With further developments in electronic equipment resulting in portable printers and facsimile machines, one can easily simulate a complete office in a transient space. When using portable equipment there exists the need for an adequate support assembly which can safely secure the equipment and protect the equipment from moving around to avoid damage during transit and use. In addition to supporting the equipment, it is important that the support allow full accessibility during use.

It is usually inconvenient to set up a portable computer and its accessory equipment on readily available surfaces, particularly in a motor vehicle where the available surfaces are limited primarily to seating, the floor, the dashboard or even the user's lap. These readily available surfaces are usually inadequate, allowing the equipment to shift around during use. Unwanted shifting can cause damage not only to the equipment but to the work product as well. In addition, the equipment cannot be quickly set up for use nor easily adjusted to a convenient position for the user.

Consequently, there is a need for a device that not only securely maintains the equipment on its supporting surface, but also allows full access by the user to the equipment. There is a further need for a support assembly that can be adjusted to hold different sized equipment and differently configured equipment.

Additionally, there is a need for a support platform that can be adjusted quickly and easily to make user access more convenient and comfortable.

For the foregoing reasons there is a need for a support platform having an adjustable holddown device for securing various sized, shaped and configured laptop computers and other equipment to the platform while enabling the user to have full access to the equipment. Also included is a secondary platform for supporting a laptop computer accessory, such as a printer, in order that both can be mounted together in a vehicle for use.

SUMMARY

The present invention is a support assembly having a primary platform with an adjustable holding means for securing electronic equipment, such as a laptop computer, phone or facsimile machine to the platform. The adjustable holding means is a holddown device comprising a plurality of cables that can be adjusted to different positions on the primary platform so that full access to the equipment is allowed while the equipment is held securely in place on the support. Quick release clamps can tighten the cables in place around the supported equipment and can release the cables when removal of the equipment is desired.

In addition, the support includes a secondary platform attached to the primary platform for supporting additional accessory equipment, such as a computer printer. The secondary platform is disposed a distance below the lower surface of the primary platform and can be adjusted laterally thereto. A set of straps on the secondary platform secure the equipment thereon.

Finally, the support assembly includes an adjustable support bracket that provides selective adjustments for height, rotation and angular positioning of the primary and secondary platforms. Hence, the equipment can be held in selected positions desirable to the user.

It is an object of the present invention to provide a support assembly with an adjustable holddown device for securing equipment to the assembly.

It is a further object of the present invention to provide a holddown device for a platform on a support assembly which allows full access to the equipment held thereby.

It is a further object of the present invention to provide an adjustable holddown device for a platform which can be adjusted to accommodate various sizes and types of equipment.

It is a further object of the present invention to provide a support assembly having a primary platform with a secondary platform for supporting additional equipment in a vehicle.

It is a further object of the present invention to provide a support platform for supporting a laptop computer along with a printer in a vehicle wherein the equipment is fully accessible to the user.

It is a further object of the present invention to provide an adjustable support assembly for supporting a computer in a vehicle wherein the computer is readily accessible to the user.

DETAILED DESCRIPTION

Figure 1:
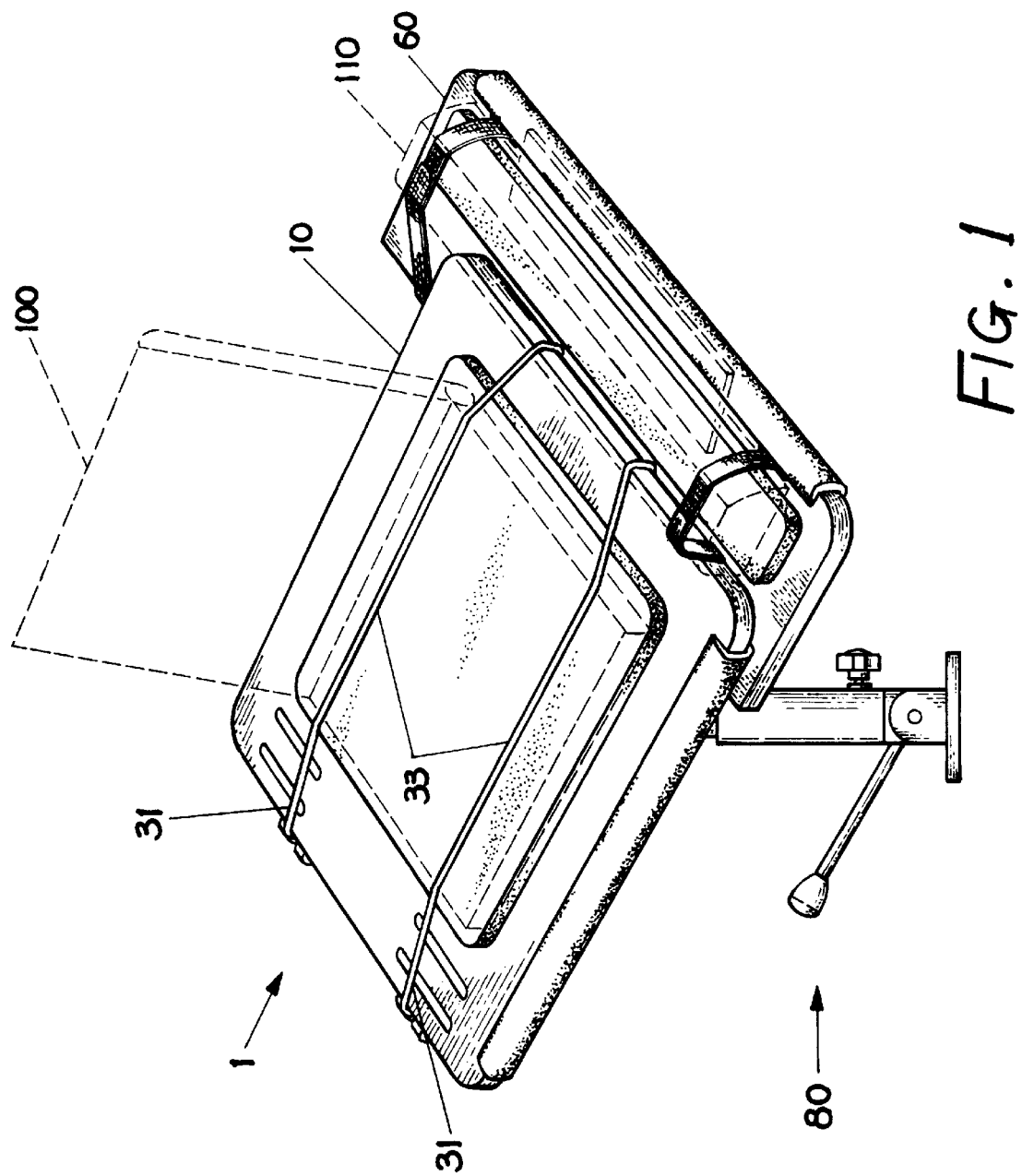
FIG. 1 is a top, front perspective view of a preferred embodiment of the invention with a laptop computer and printer mounted thereon.

Referring now to the drawings, wherein like reference numerals designate corresponding structure throughout the views, and referring in particular to FIG. 1, there is shown a preferred embodiment of the support assembly (1) of the present invention comprising a primary platform (10) with an article holding means, a secondary platform (60) and an articulating support bracket (80) supporting the primary (10) and secondary (60) platforms.

Figure 2:
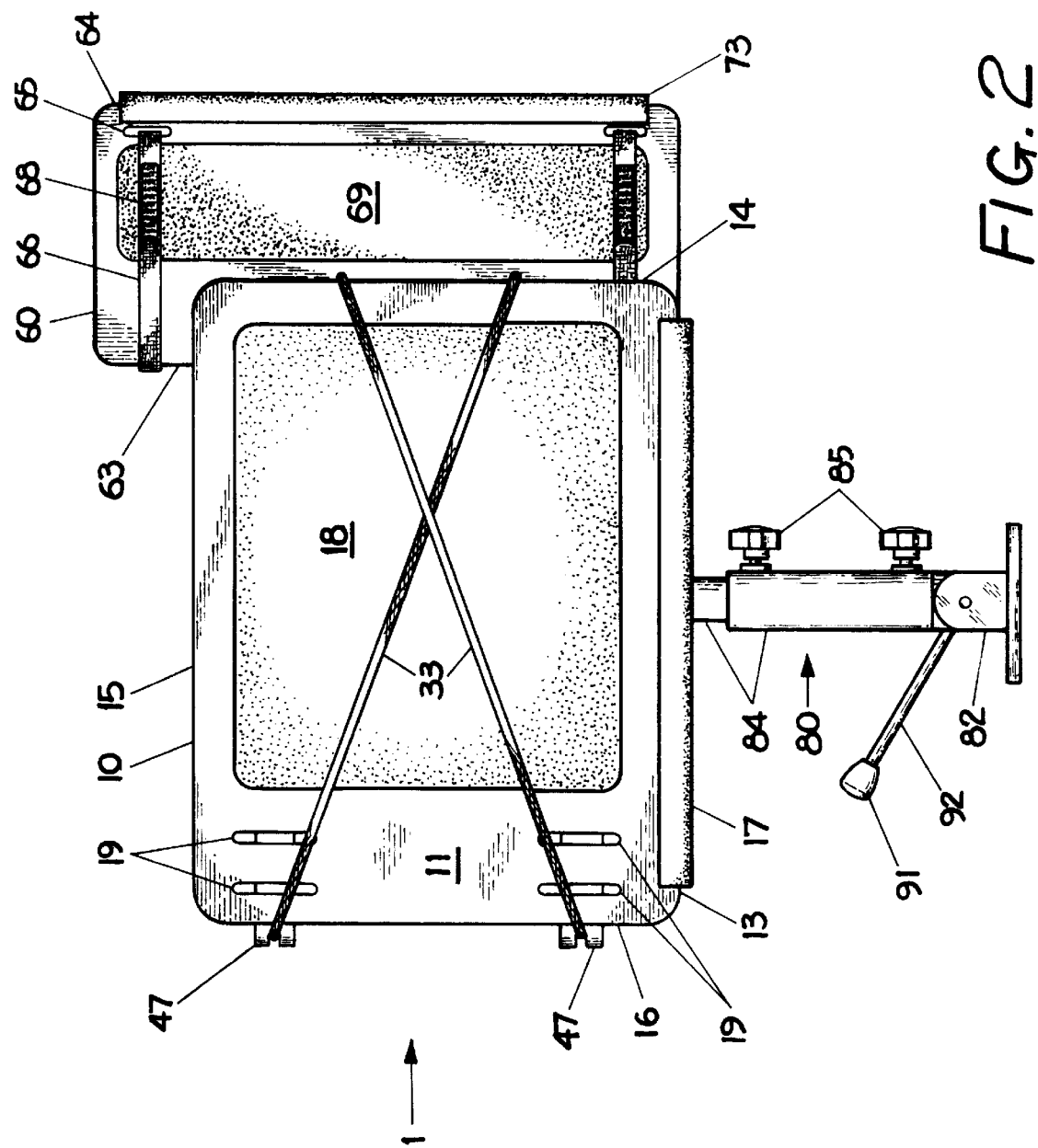
FIG. 2 is a top planar view of the support assembly of the embodiment of FIG. 1.
Figure 3:
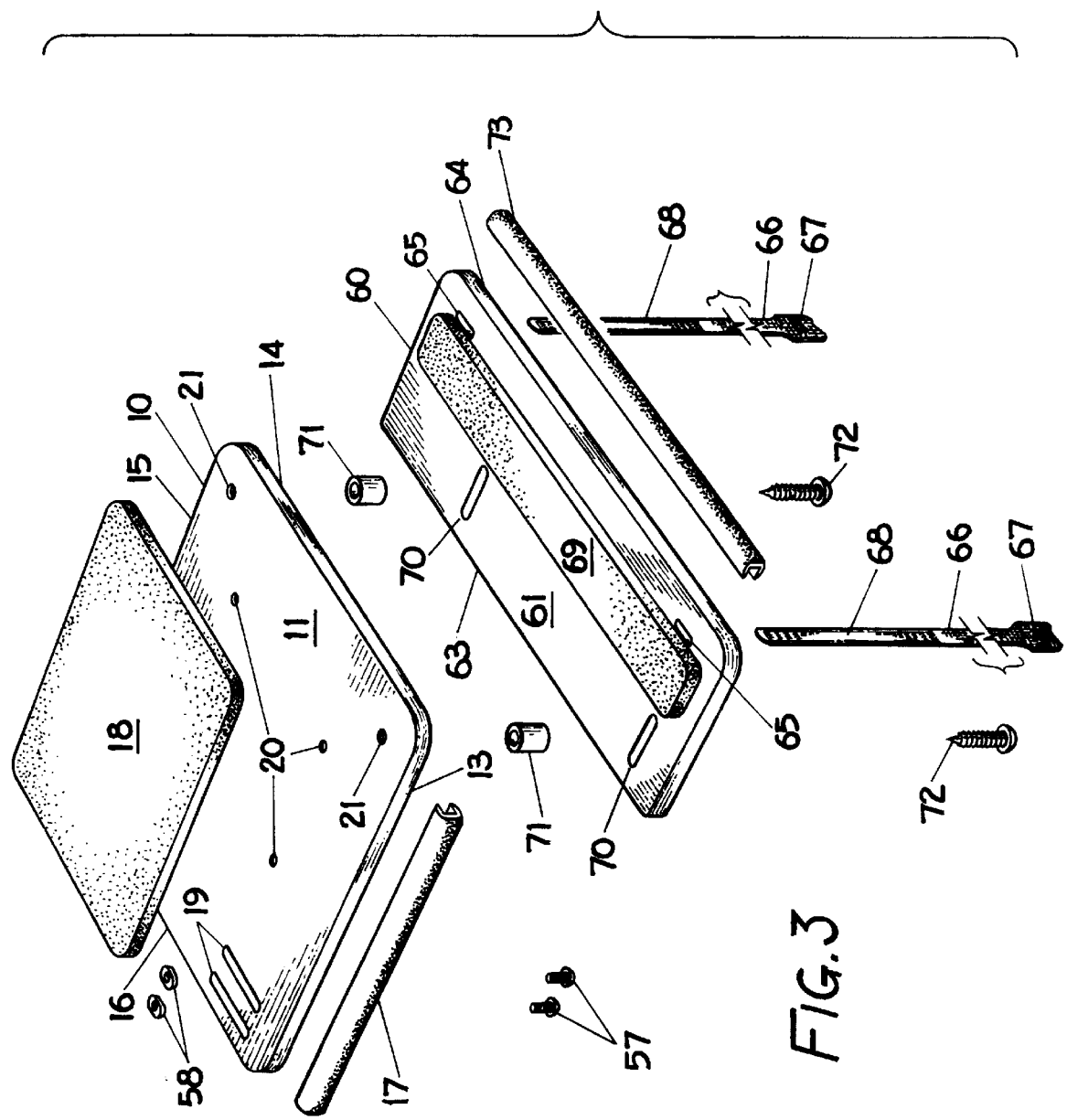
FIG. 3 is an exploded view from a top, front perspective of the primary and secondary platforms shown FIG. 2.
Figure 4:
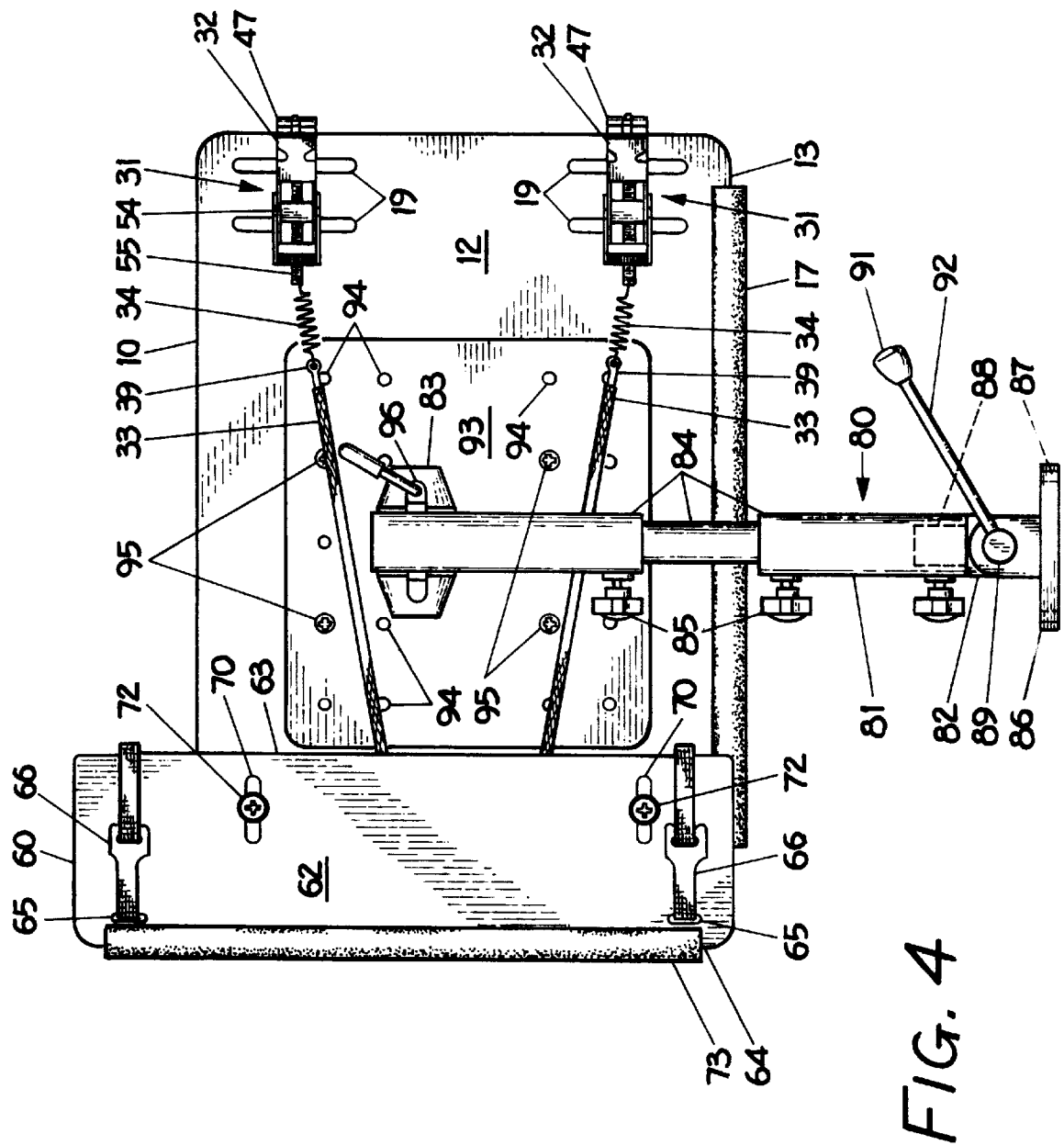
FIG. 4 is a bottom, planar view of the support platform of the embodiment in FIG. 2.

As shown in FIGS. 2–4, the primary platform (10) has an upper surface (11) and an opposing lower surface (12) surrounded by a plurality of edges (13–16). A first edge (13) of the primary platform (10) has a protective bumper (17) disposed therealong and a pad (18) is positioned on the upper surface (11). An adjustable attaching means on the primary platform (10) comprises two sets of parallel slots (19). A plurality of apertures are disposed in the primary platform (10), including bracket attaching apertures (20) and platform adjoining apertures (21).

Referring to FIG. 4, the article holding means comprises a pair of adjustable holddown devices (31). Each adjustable holddown device (31) includes a quick release clamp (32), a cable (33), and a spring (34).

Figure 5:
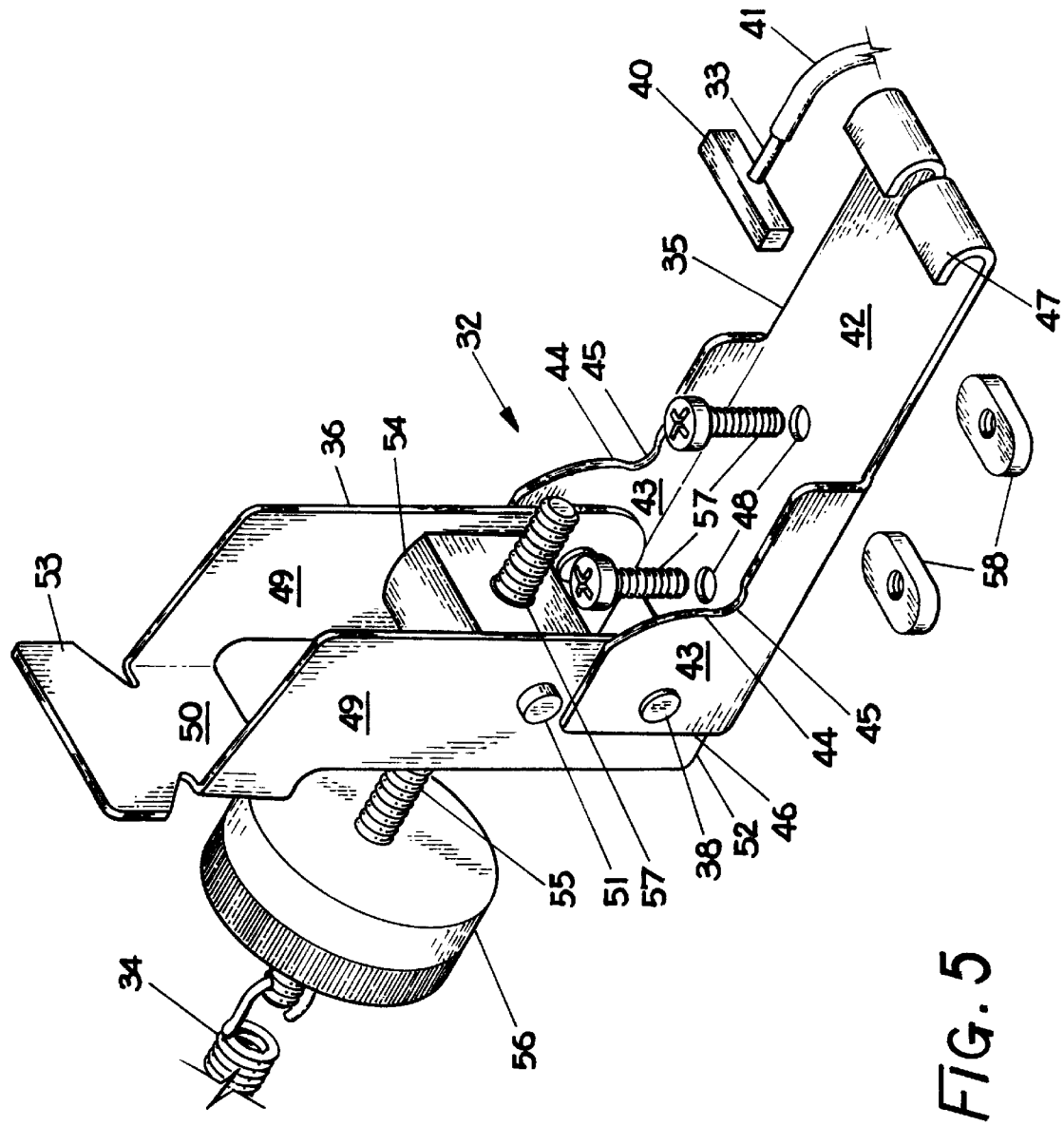
FIG. 5 is a top, front perspective of one of the quick release clamps of FIG. 4, shown in an open configuration.
Figure 6:
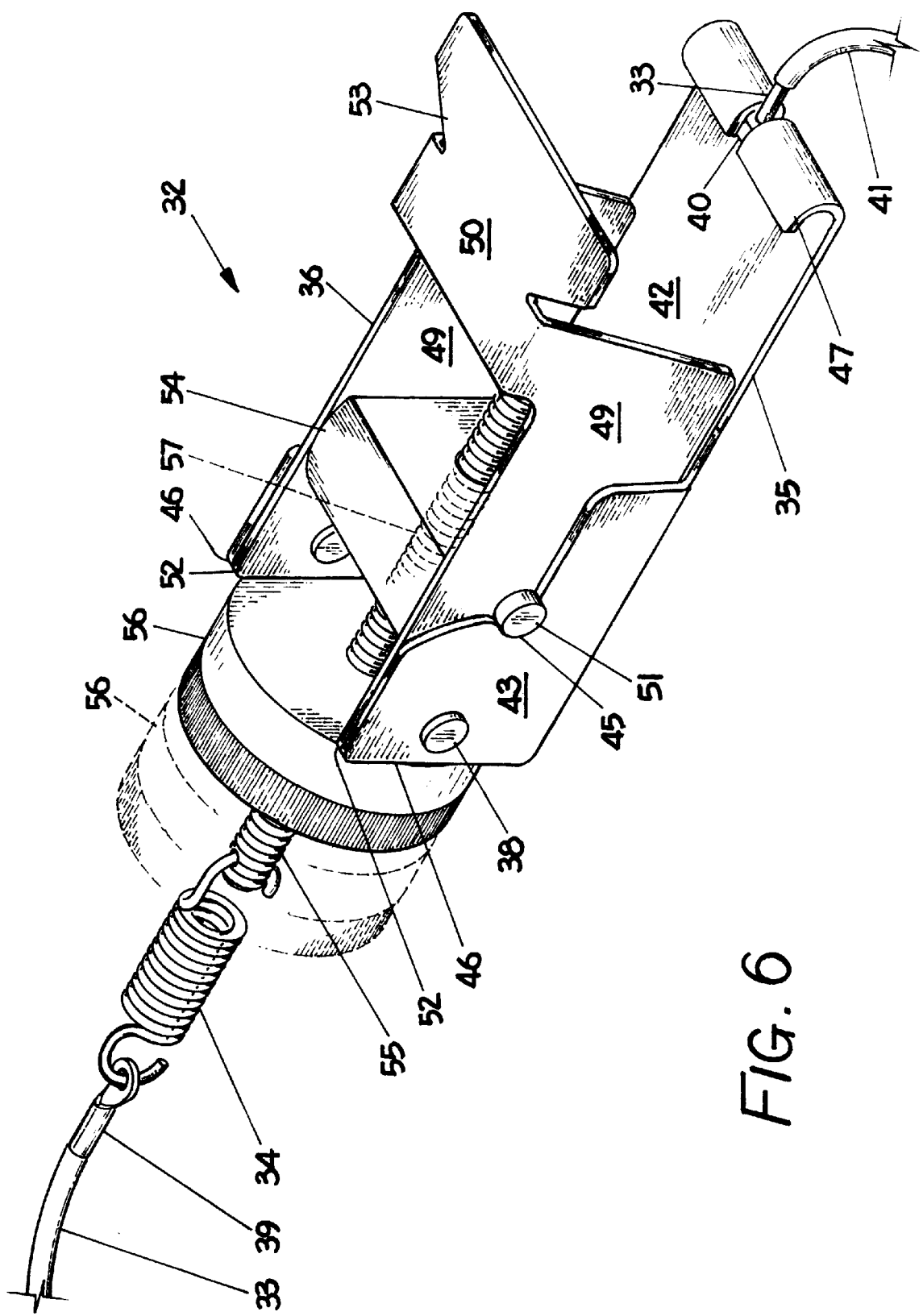
FIG. 6 is a top, front perspective of the quick release clamp of FIG. 5, shown in a closed configuration.

The quick release clamp (32) of the preferred embodiment shown in FIGS. 5 and 6 includes a clamp base (35), a lever arm (36), and a cable adjusting means. In a preferred embodiment, the cable adjusting means comprises a pivotal lug (54), an adjusting rod (55) and a lock nut (56). A hinge (38) pivotally mounts the lever arm (36) on the clamp base (35). Each cable (33) has a first end with an eye (39) thereon and a second end with an enlarged end piece (40). A sheath (41) covers most of the length of the cable (33).

The clamp base (35) comprises an elongate plate (42) with a pair of opposing side walls (43). Each side wall (43) has a forward edge (44) with a notch (45) therein and a rearward locking edge (46) opposite the forward edge (44). A slotted ear (47) projects from an end of the elongate plate (42) and a plurality of base apertures (48) extend through the elongate plate (42).

The lever arm (36) of each quick release clamp (32) comprises a pair of side plates (49) adjoined by a cross piece (50). The side plates (49) each have a protrusion (51) projecting therefrom and a rear edge (52). A tab (53) extends from a front end of the crosspiece (50).

Referring back to the preferred embodiment shown in FIGS. 3 and 4, the secondary platform (60) is shown to comprise a top surface (61), an opposing bottom surface (62), an inner edge (63) and an opposing outer edge (64). A pad (69) is disposed on the top surface (61) of the secondary platform (60), while a protective bumper (73) is positioned along the outer edge (64) thereof.

The secondary platform (60) also includes a secondary article attaching means and a platform adjoining means. The secondary article attaching means includes a pair of securement slots (65) on the secondary platform (60). Positioned in each securement slot (65) is a securing strap (66). Each securing strap (66) includes a strap opening (67) and a fastener (68). Preferably, the fastener (68) is a hook and loop type fastener, although any type of suitable fastener could be used instead.

In the preferred embodiment of the present invention, the platform adjoining means on the secondary platform (60) includes openings which comprise two sets of parallel adjusting slots (70), a pair of tubular spacers (71), and a pair of platform adjoining screws (72).

The support bracket (80) is shown in FIG. 4 to be an adjustable stanchion (81) attached to a bracket base (82) and a bracket head (83). The adjustable stanchion (81) includes a plurality of telescoping members (84) that are held in various longitudinal positions by set screws (85). The bracket base (82) includes a plate (86) having apertures (87), and an interlocking upright member (88) pivotally attached to the plate (86) by a hinge (89) having a conventional locking hub. A protective cap (91) is attached to the bracket base (82) by a tether (92).

The bracket head (83) of the support bracket (80) includes a universal mounting plate (93) having a plurality of platform attaching apertures (94) with cooperating screws (95). The bracket head (83) is attached by a hinge (96) to the upper end of the adjustable stanchion (81) with a conventional locking hub for securing the universal mounting plate (93) and the stanchion (81) at various angles relative to each other.

In the preferred embodiment in FIGS. 2–4, the primary (10) and secondary (60) platforms of the present invention are planar, having a generally rectangular shape. Each set of parallel slots (19), the bracket attaching apertures (20), and the platform adjoining apertures (21) on the primary platform (10) can be countersunk. Additionally, the adjusting slots (70) on the secondary platform (60) can be countersunk, as well. Both of the protective bumpers (17,73) are elongate with a generally U-shaped cross section to fit around the first (13) and outer (64) edges of the respective primary (10) and secondary (60) platforms.

On the clamp base (35) of each quick release clamp (32), as shown in FIGS. 5–6, the slotted ear (47) comprises a curvilinear shape and size that cooperates to receive the enlarged end piece (40) of cable (33) therein. Furthermore, the slotted ear (47) can be bifurcated with a slot positioned between the bifurcations.

The pivotal lug (54) of the cable adjusting means is a cylindrically shaped element having a threaded aperture (57) extending therethrough. The adjusting rod (55) is threaded to engage with the threaded aperture (57) of the pivotal lug (54).

The protective cap (91) in FIG. 2, tethered to the bracket base (82), is tubular, having a closed end, while the tether (92) is an elongated cable.

Preferably, the pad (18) on the primary platform (10) and the pad (69) on the secondary platform (60) is made of a soft rubber or a polyurethane foam. The protective cap (91) on the bracket base (82) and the protective bumpers (17,73) are preferably made from a soft rubber or polyurethane foam, as well.

In the preferred embodiment of FIG. 1, the primary platform (10) is shown to support a laptop computer (100). The secondary platform (60) is shown to support a printer (110). However, the platforms (10,60) could support various other types of equipment instead, including a telephone, facsimile machine or radio.

Referring to FIGS. 1 and 2, the pads (18,69) on the primary (10) and secondary (60) platforms grip the bottom of the supported equipment and can further attenuate vibrations transmitted through the support bracket (80). The protective bumper (17) along the first edge (13) of the primary platform (10) and the protective bumper (73) along the outer edge (64) of the secondary platform (60) cover those respective edges for protection from damage or injury. The article holding means secures the equipment to primary platform (10).

In the preferred embodiment of the present invention set forth in FIG. 1, adjustable holding devices (31) each have a cable (33) which encircles the laptop computer (100) and the primary platform (10). Each cable (33) is tightened down by a respective quick release clamp (32), as shown in FIG. 4.

The tension of each cable (33) can be separately regulated by the cable adjusting means (31). In a preferred embodiment shown in FIGS. 5 and 6, the adjusting rod (55) of each quick release clamp (32) can be advanced in either a fore or aft direction through the pivotal lug (54) in order adjust the effective length of the attached cable (33). The respective spring (34) takes up slack in the cable (33) as the quick release clamp (32) is closed, thereby pulling the cable (33) tightly around the equipment. Covering each cable (33) is a sheath (41), preferably made of plastic, which protects the computer (100) from damage by the cable (33).

As shown in FIG. 1, the article holding means secures the laptop computer (100) to the primary platform (10), while enabling full user access to the sides and top of the laptop computer (100) supported thereby. In a preferred embodiment of the present invention, the article holding means comprises a pair of adjustable holddown devices (31), each of which includes a quick release clamp (32), as shown in FIG. 4.

Each quick release clamp (32) is attached to a respective set of parallel slots (19) on the primary platform (10) by clamp adjusting screws (57) and cooperating nuts (58). The clamp adjusting screws (57) can be loosened to allow the quick release clamp (32) to slide in its respective set of parallel slots (19). By moving the quick release clamps (32) along the slots (19), the attached cables (33) also move. Consequently, the cables (33) can be selectively positioned, for example, around a laptop computer such that port openings and the keyboard on the computer are not covered by the cable (33), and are fully accessible to the user. When the cables (33) are positioned as desired, the clamp adjusting screws (57) are tightened to lock each quick release clamp (32) in its corresponding location.

Referring to one of the adjustable holddown devices (31), the lever arm (36) of each quick release clamp (32) is pivotally attached to the clamp base (35). The lever arm (36) can be manipulated using the tab (53) which acts as a handle to pivot the clamp (32) between an open position as shown in FIG. 5 and a closed position as shown in FIG. 6. In the closed position of FIG. 6, each of the protrusions (51) on the lever arm (36) is engaged with a respective notch (45) on the side walls (43) of the clamp base (35) to releasably hold the lever arm (36) adjacent to the clamp base (35).

The lock nut (56) locks the lever arm (36) in place to maintain the clamp (32) in the closed position when the lock nut (56) (as shown in solid lines in FIG. 6) is seated against the rearward locking edges (46) of the side walls (43) of the clamp base (35). When the lock nut (56) is spaced from the rearward locking edges (46) of the side walls (43) (as shown in dotted lines in FIG. 6), the lever arm (36) is allowed to pivot to open the quick release clamp (32). As also shown in FIG. 6, the slotted ear (47) releasably holds the enlarged end piece (40) of the cable (33).

On the secondary platform (60), as shown in FIG. 3, the equipment attaching means comprises a pair of straps (66) for holding the equipment onto the secondary platform (60). The straps (66) can be adjustably closed by the hook and loop fasteners (68) to fit around different sizes and types of equipment held on the secondary platform (60).

The platform adjoining means attaches the secondary platform (60) a spaced distance below the primary platform (10) and enables the secondary platform (60) to be adjusted laterally with respect to the primary platform (10). In a preferred embodiment, the tubular spacers (71) maintain the space between the primary (10) and secondary (60) platforms. By loosening the platform adjoining screws (72), which are positioned in respective adjusting slots (70), the secondary platform (60) can be adjusted to a selected position relative to the primary platform (10).

In FIG. 4, the support bracket (80) provides an adjustable means for supporting the platforms (10,60) on a supporting surface. In a preferred embodiment of the present invention, the adjustable stanchion (81) can be adjusted in length to change the height of the primary (10) and secondary (60) platforms relative to that supporting surface.

Furthermore, the adjustable stanchion (81) along with the platforms (10,60) can be readily removed from the bracket base (82), which remains attached to the supporting surface. By loosening the set screw which secures the interlocking upright member (88) to the lowermost telecoping member (84) and lifting, the platforms (10,60) and the adjustable stanchion (81) can be separated from the bracket base (82). With the adjustable stanchion (81) removed, the protective cap (91) can be positioned over the interlocking upright member (88) for padding to avoid injury or damage.

Preferably, the support bracket (80) can be attached to the floor of a vehicle by the bracket base (82). The plate (86) of the bracket base (82) includes apertures (87) which receive fasteners for securing the support bracket (80) to the vehicle. The interlocking upright member (88) is hingedly attached to the bracket base (82) and is in turn received within the lowermost telescoping member (84) of the adjustable stanchion (81).

The universal mounting plate (93) of the bracket head (83) is secured by the hinge (96) to one of the telescoping members (84) on the uppermost end of the adjustable stanchion (81) opposite the attached bracket base (82). The lower surface (12) of the primary platform (10) is attached to the universal mounting plate (93) via a plurality of screws (95).

The upper surface (11) of the primary platform (10) is directed away from the support bracket (80) and holds the pad (18) thereon. The protective bumper (17) is disposed along the first edge (13) of the primary platform (10).

Each of the quick release clamps (32) are attached to the lower surface (12) of the primary platform (10). The clamp base (35) of each quick release clamp (32) extends across a respective set of parallel slots (19) and is attached to each set of parallel slots (19) by respective clamp adjusting screws (57) and cooperating nuts (58). The slotted ear (47) on the clamp base (35) preferably extend outwardly beyond the fourth edge (16) of the primary platform (10).

Each of the cables (33) is attached to a respective quick release clamp (32). The eye (39) on the first end of the cable (33) is attached to one end of a respective spring (34), while the enlarged end piece (40) on the other end of the cable (33) is releasably engaged by a slotted ear (47) on the respective clamp base (35).

Each spring (34) is attached to an outer end of a respective adjusting rod (55). The adjusting rod (55) is threadedly engaged in the threaded aperture (57) which extends through the pivotal lug (54). The lug (54), in turn, is pivotally mounted between the side plates (49) of the corresponding lever arm (36) on the quick release clamp (32).

As shown in FIGS. 3 and 4, the secondary platform (60) is disposed below the primary platform (10) such that the top surface (61) of the former is facing the lower surface (12) of the latter. The platform adjoining apertures (21) on the primary platform (10) are positioned directly above the adjusting slots (70) on the secondary platform (60). Each of the tubular spacers (71) extend between a respective platform adjoining aperture (20) and adjusting slot (70). A respective platform adjoining screw (72) extends through each adjusting slot (70) and one of the tubular spacers (71), and engages threads positioned within a corresponding platform attaching aperture (21).

The adjusting slots (70) extend in a direction generally transverse to the inner (63) and outer (64) edges of the secondary platform (60) and the slots (70) extend from near the inner edge (63) towards a center portion of the secondary platform (60).

The securement slots (65) are disposed adjacent and parallel to the outer edge (64) with a respective strap (66)

extending through each securement slot (65). The protective bumper (73) is disposed along the outer edge (64) of the secondary platform (60), while the pad (69) is positioned on the top surface (61) thereof.

The size of the protrusions (51) on each quick release clamp (32) of FIGS. 5 and 6 is commensurate with the notches (45) on the side walls (43) of the clamp base (35) so that each protrusion (51) can fit snugly within its respective notch (45). Preferably, there is minimal play or movement between the lever arm (36) and clamp base (35) when the quick release clamp (32) is closed.

In a preferred embodiment of the present invention shown in FIGS. 2–4, the primary platform (10) has a first (13), second (14), third (15) and fourth (16) edges. The first (13) and third (15) edges are opposite each other and the second (14) and fourth (16) edges are opposite each other. Each set of parallel slots (19) are adjacent to and extend in a direction parallel to the fourth edge (16).

The platform adjoining apertures (21) are along the second edge (14) of the primary platform (10). In a center area of the primary platform (10) are the plurality of bracket attaching apertures (20). These apertures (20) can be configured in a universal pattern for attachment to a variety of differently patterned apertures on the support bracket (80). Conversely, the bracket head (83) of the support bracket (80) can be characterized by a universal pattern of platform attaching apertures (94).

Each of the quick release clamps (32) includes an open configuration as shown in FIG. 5 and a closed configuration as shown in FIG. 6. In the open configuration, the lever arm (36) is pivoted away from the clamp base (35) such that the protrusions (51) are not seated in the notches (45) on the side walls (43) of the clamp base (35).

In the closed configuration, the lever arm (36) is pivoted toward the clamp base (35) such that the protrusions (51) on the lever arm's side walls (49) are engaged in the notches (45). Additionally, when the clamp (32) is closed, the lever arm (36) lies adjacent to the clamp base (35).

Each quick release clamp (32) can be readily opened by forcing the lever arm (36) away from the clamp base (35) with enough force to disengage the protrusions (51) from the notches (45).

However, the quick release clamp (32) can be locked in the closed configuration to hinder quick release of the clamp (32), as follows. With the lever arm (36) in the closed configuration, the lock nut (56) is advanced along the adjusting rod (55) until the lock nut is preferably seated against the rearward locking edges (46) of the clamp base (35). In this position, the lock nut (56) holds the lever arm (36) against pivoting into the open configuration.

In a preferred embodiment, the support assembly (1) of the present invention can be installed on the floor of a motor vehicle, where it is positioned such that the upper surface (11) of the primary platform (10) is generally directed away from the vehicle's floor. The support bracket (80) is adjustable, so the platforms (10,60) can be adjusted angularly, vertically and rotationally for the user's comfort. In use, each cable (33) should extend from respective spring (34) attached to respective adjusting rod (55) on respective quick release clamp (32), across the lower surface (12) of the primary platform (10), between the tubular spacers (71), around the second edge (14) of the primary platform (10), over the upper surface (11) and equipment supported thereon and around the fourth edge (16) to the slotted ear (47) of respective clamp (32).

On the secondary platform (60), the securing straps (66) extend through respective securement slots (65). With a printer or other equipment supported thereon, each securing strap (66) preferably extends through a respective securement slot (65) and around the inner edge (63) to form a closed loop around most of the secondary platform (60) and the equipment positioned thereon.

In a preferred use of the present invention, a laptop computer (100) is placed on the upper surface (11) of primary platform (10), as shown in FIG. 1. The clamp adjusting screws (57) are loosened, allowing the respective clamps (32) to slide within the parallel slots (19). Each of the quick release clamps (32) is positioned along the respective set of parallel slots (19) so that the cables (33) will not impede access to the computer (100) secured thereby. The respective clamps (32) are each secured into place by tightening the respective clamp adjusting screws (57).

The quick release clamps (32) are each opened and the respective cables (33) are thereby loosened. The loosened cables (33) are each positioned around the primary platform (10) and over the laptop computer (100) supported thereon. The enlarged end piece (40) of each cable (33) is placed within the respective slotted ear (47). The effective length of the cables (33) can be adjusted by rotating the respective adjusting rod (55) to move it fore or aft with respect to the respective pivotal lug (54). The lever arm (36) is then pivoted to the closed configuration wherein the protrusions (51) are received within the notches (45). The lock nut (56) is advanced along the adjusting rod (55) to engage the rearward locking edges (46) of the clamp base (35), thereby securing the clamp (32) in its closed configuration.

The second platform (60) can be used in cooperation with the primary platform (10). Each of the pair of platform adjoining screws (72) is extended through a respective adjusting slot (70) and tubular spacer (71) to attach to the respective platform adjoining aperture (21) on the primary platform (10). The secondary platform (60) can be adjusted laterally with respect to the primary platform (10) by loosening the platform adjusting screws (72) and sliding them along the adjusting slots (70) to the desired position, then tightening the platform adjusting screws (72).

The computer printer (110) is mounted on the secondary platform (60) by placing the printer (110) on the top surface (61) of the platform (60) and wrapping the straps (66) around the printer (110) and platform (60), as shown in FIG. 1. The straps (66) are fastened to secure the printer (110) onto the secondary platform (60).

The support bracket (80) can be adjusted to variable heights by loosening the set screws (85) and sliding the telescoping members (84) relative to each other, then tightening the set screws (85). On the bracket base (82) and the bracket head (83), the respective hinges (89,96) can be loosened by releasing the locking hubs, the platforms (10, 60) adjusted to a desired angular position, and the locking hubs subsequently tightened to maintain the selected angular position.

The previously described embodiment of the present invention has many advantages. Among such advantages are those set forth as follows.

The adjustable holddown means securely holds supported equipment on the primary platform. The cables and the quick release clamps of the adjustable holddown means can be readily adjusted in order that differently sized and configured equipment can be supported on the platform, while enabling full accessibility to the equipment by the user.

The secondary platform provides a support spaced from the primary platform for holding accessory equipment. The secondary platform can be adjusted to an appropriate position to allow for close cooperation between the equipment.

Furthermore, the support bracket enables convenient positioning of the primary and secondary platforms to facilitate usage.

In an alternate embodiment, the support assembly can be used without the secondary platform. The secondary platform can be removed from the primary platform by loosening and withdrawing the platform adjoining screws. With the platform adjoining screws removed, the secondary platform and tubular spacers can be separated from the primary platform.

Although the present invention has been described in considerable detail with reference to certain preferred versions thereof, other versions are possible. Therefore, the spirit and scope of the appended claims should not be limited to the description of the preferred versions contained herein.

What is claimed is:

1. A support assembly comprising:
   (a) a primary platform having an article holding means and an adjustable attaching means for adjustably securing the article holding means to the primary platform; and
   (b) a support bracket;
   wherein said article holding means further comprises a clamp, a cable adjusting means, and a cable, the cable is attached to said cable adjusting means and is attached to said clamp, and said adjustable attaching means for adjustably securing the article holding means to the primary platform comprises at least one set of parallel slots which slideably support said clamp therein.

2. A support assembly comprising:
   (a) a primary platform having an article holding means and an adjustable attaching means for adjustably securing the article holding means to the primary platform;
   (b) a support bracket; and
   (c) a secondary platform having a secondary article attaching means and a platform adjoining means.

3. The support assembly of claim 2, wherein said primary platform further comprises at least one platform adjoining aperture;
   said platform adjoining means comprises at least one tubular spacer, at least one opening and at least one fastener which extends through the at least one opening and said at least one tubular spacer to engage said at least one platform adjoining aperture.

4. The support assembly of claim 3, wherein said secondary article attaching means further comprises at least one securement slot extending through the secondary platform and at least one securing strap received through the at least one securement slot.

5. The support assembly of claim 4, wherein said at least one opening in the secondary platform comprises at least one adjusting slot.

6. The support assemly of claim 4, wherein said at least one securing strap includes a fastener.

7. The support assembly of claim 2, wherein said secondary platform is positioned below said primary platform.

8. A support assembly comprising:
   (a) a primary platform having at least one slot;
   (b) at least one holddown device further comprising a clamp, a cable adjusting means on said clamp, and a cable attached to said cable adjusting means; and
   (c) a support bracket attached to said primary platform;
   said clamp comprising:
   (1) a clamp base having a plate with upwardly extending side walls, wherein the side walls have a forward edge with a notch formed therein;
   (2) a lever arm having a pair of opposing side plates adjoined by a crosspiece, each of said opposing side plates including a protrusion; and
   (3) a hinge pivotally attaching said lever arm to said clamp base;
   wherein said clamp is slideably attached to said at least one slot on said primary platform, and said clamp further comprises a closed configuration wherein said protrusions on said lever arm are engaged with respective notches on said clamp base and an open configuration wherein said protrusions on said lever arm are spaced apart from the respective notches on said clamp base.

9. The support assembly of claim 8, wherein said at least one slot comprises at least one set of parallel slots.

10. The support assembly of claim 8, wherein said cable adjusting means further comprises: (a) a lug disposed on said clamp and having a threaded aperture therethrough, and (b) a threaded rod engaged in said threaded aperture; wherein said cable is attached at one end to said threaded rod.

11. The support assembly of claim 8, wherein said cable adjusting means further comprises: (a) a lug disposed on said lever arm and having a threaded aperture therethrough, and (b) a threaded rod engaged in said threaded aperture; wherein said cable is attached at one end to said threaded rod.

12. The support assembly of claim 11, further comprises a lock nut threadedly engaged on said threaded rod, wherein each of said side walls further comprises a locking edge;
    said lock nut is movable on said threaded rod for engaging at least one of said locking edges to secure said clamp in the closed position, and for disengaging said at least one locking edge to allow pivotal movement of said lever arm into the open position.

13. The support assembly of claim 8, wherein said clamp further comprises an ear; and
    said cable further comprising an enlarged end piece releasably attached to the ear on the clamp.

14. The support assembly of claim 8, wherein said clamp base further comprises a slotted ear; and
    said cable further comprising an enlarged end piece releasably attached to the slotted ear of the clamp base.

15. A support assembly for securing electronic equipment in a vehicle in order that the equipment is fully accessible to a user, said support assembly comprising:
    (1) a primary platform with a rectangular shape having an upper surface, a lower surface, said primary platform further comprises a pad disposed on said upper surface, a protective bumper positioned on said first edge, at least one support attaching aperture for attaching said primary platform to a support bracket, an article holding means, at least one platform adjoining aperture and an adjustable attaching means which includes at least one set of parallel slots, at least one clamp attaching screw and at least one cooperating nut;
    (2) a secondary platform with a rectangular shape having a top surface, a bottom surface, an outer edge and an opposing inner edge, a pad disposed on the top surface and a protective bumper disposed along the outer edge; said secondary platform further comprises at least one securement slot and at least one securing strap, wherein said at least one securing strap includes a respective fastener, said at least one securing strap being disposed in said at least one securement slot, said secondary platform further comprises a platform adjoining means including at least one tubular spacer, at least one adjusting slot and at least one platform adjoining screw; wherein said at least one platform adjoining screw extends through said at least one adjusting slot and said at least one threaded spacer, and engages said at least one threaded aperture, with the at least one tubular spacer being disposed between the lower surface of the primary platform and the top surface of the secondary platform, adjoining the secondary platform at selected lateral positions and at predetermined distances from the primary platform;

(3) a support bracket attached to the primary platform and including:
   (a) an adjustable stanchion comprising a plurality of telescoping members;
   (b) a bracket base further comprising a plate for securing the support bracket to a supporting surface, an interlocking upright member which is removably secured to the adjustable stanchion, a protective cap having a tether which holds said protective cap to the bracket base; wherein when the adjustable stanchion is removed from said base, the protective cap can be positioned on the interlocking upright member;
   (c) a bracket head pivotally mounted to said adjustable stanchion;

said article holding means on the primary platform further comprising at least one adjustable holddown device which includes:
   (a) a quick release clamp;
   (b) a cable having an enlarged end piece on an end thereof;
   (c) a spring attached between the cable and the clamp;
   (d) a clamp base comprising an elongate plate having two upwardly extending side walls, each side wall having a forward edge and a rearward locking edge, a notch disposed on the forward edge of each upwardly extending sidewall, and said elongate plate having a slotted ear wherein said enlarged end piece is disposed in said slotted ear;
   (e) a lever arm pivotally attached to said clamp base and further comprises a pair of side plates extending generally parallel to each other and adjoined by a crosspiece, and a protrusion on each side plate;
   (f) a cable adjusting means further comprises: a lug with a threaded aperture and pivotally mounted between the side plates of the lever arm, a threaded adjusting rod engaging said threaded aperture on said lug, and a lock nut threadedly engaged on said adjusting rod;

said quick release clamp having a closed configuration and an open configuration, wherein in said closed configuration the side plates of the lever arm are aligned with the elongate plate of the base and the protrusions are positioned in the respective notches on the sidewalls of the clamp base, and in said open configuration said side plates of the lever arm are spaced apart from the elongate plate with the protrusions being disengaged from the respective notches;

wherein to lock each of said quick release clamps in said closed configuration, the lever arm is pivoted to the closed configuration and the lock nut is advanced on the adjusting rod towards the clamp until the lock nut abuts at least one of the rearward locking edges thereby limiting pivotal movement between the lever arm and the clamp base.

16. A support assembly comprising:
(a) a primary platform having at least one slot, said primary platform includes a pad disposed on an upper surface thereof, and a protective bumper on an edge thereof;

(b) at least one holddown device further comprising a clamp and a cable, said clamp having cable adjusting means, and said cable attached to said cable adjusting means; and (c) a support bracket attached to said primary platform;
wherein said clamp is slideably attached to said at least one slot on said primary platform.

17. A support assembly comprising:
(a) a primary platform having at least one slot;
(b) at least one holddown device further comprising a clamp and a cable, said clamp having cable adjusting means, and said cable attached to said cable adjusting means;
(c) a support bracket attached to said primary platform; and
(d) a secondary platform having a platform adjoining means for securing the secondary platform to said primary platform;
wherein said clamp is slideably attached to said at least one slot on said primary platform and said secondary platform extends outwardly from an edge of said primary platform.

18. The support assembly of claim 17, wherein said platform adjoining means includes at least one adjusting slot extending through the secondary platform, at least one tubular spacer and at least one fastener;
said primary platform having at least one platform adjoining aperture;
wherein said at least one fastener extends through said at least one adjusting slot, through said at least one tubular spacer and engages said at least one platform adjoining aperture to adjustably secure the secondary platform to the primary platform.

19. The support assembly of claim 17, wherein said secondary platform further comprises at least one securement slot and at least one securing strap extending through said at least one securement slot, wherein said at least one securing strap includes a fastener.

20. The support assembly of claim 19, wherein said fastener comprises a hook and loop-type fastener.

21. A support assembly comprising:
(a) a primary platform having an article holding means and an adjustable attaching means for adjustably securing the article holding means to the primary platform; and
(b) a support bracket;
wherein said adjustable attaching means comprises at least one set of parallel slots which slideably support said clamp therein.

22. A support assembly comprising:
(a) a primary platform having at least one slot;
(b) at least one holddown device further comprising a clamp and a cable, said clamp having cable adjusting means, and said cable attached to said cable adjusting means; and
(c) a support bracket attached to said primary platform;
said cable adjusting means comprising:
   (1) a lug having a threaded aperture therethrough; and
   (2) a threaded rod engaged in said threaded aperture;
wherein said cable is attached at one end to said threaded rod;
said clamp comprising an ear;
said cable comprising an enlarged end piece releasably attached to the ear on the clamp;
wherein said clamp is slideably attached to said at least one slot on said primary platform.

* * * * *